United States Patent
Storace (10) Patent No.: US 8,262,353 B2
(45) Date of Patent: Sep. 11, 2012

(54) DECOUPLER SYSTEM FOR ROTOR ASSEMBLIES

(75) Inventor: Albert Frank Storace, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 1320 days.

(21) Appl. No.: 11/948,423

(22) Filed: Nov. 30, 2007

(65) Prior Publication Data

US 2009/0139201 A1    Jun. 4, 2009

(51) Int. Cl.
*F01D 19/00* (2006.01)
*F01D 25/04* (2006.01)

(52) U.S. Cl. .............. 416/2; 416/174; 416/500; 60/223; 415/9; 415/119; 415/229; 384/535; 384/581; 384/624

(58) Field of Classification Search ........... 415/9, 170.1, 415/174.4, 229–231, 119; 416/2, 174, 244 A, 416/500; 60/223, 226.1; 384/624, 102, 99, 384/535, 581

See application file for complete search history.

(56) References Cited

U.S. PATENT DOCUMENTS

| | | |
|---|---|---|
| 6,098,399 A | 8/2000 | Richards et al. |
| 6,240,719 B1 | 6/2001 | Vondrell et al. |
| 6,312,215 B1 | 11/2001 | Walker |
| 6,325,546 B1 | 12/2001 | Storace |
| 6,540,483 B2 | 4/2003 | Allmon et al. |
| 6,739,837 B2 | 5/2004 | Barnette et al. |
| 6,783,319 B2 | 8/2004 | Doerfliein et al. |
| 2004/0060280 A1* | 4/2004 | Malmborg ............ 60/226.1 |
| 2005/0129343 A1* | 6/2005 | Bouchy et al. ........... 384/535 |

* cited by examiner

*Primary Examiner* — Christopher Verdier (74) *Attorney, Agent, or Firm* — General Electric Company; Matthew P. Hayden; David J. Clement (57) ABSTRACT

A rotor decoupler system for a gas turbine engine is disclosed, comprising a load reduction system disposed between a bearing system and the bearing support. The load reduction system comprises a fuse and a damper such that the damper transfers at least a part of the radial load from the rotor to the bearing support when a fuse fails. In one exemplary embodiment the damper comprises a wire mesh, disposed around the outer race of the bearing. In another exemplary embodiment the damper comprises a rope damper assembly. In yet another exemplary embodiment, a load reduction system is disposed between a support structure and a frame, comprising an extensional fuse and a damper disposed between the support structure and the frame such that the damper transfers at least a part of the unbalance load to the frame when an extensional fuse fails.

13 Claims, 7 Drawing Sheets

DECOUPLER SYSTEM FOR ROTOR ASSEMBLIES

BACKGROUND OF THE INVENTION

This invention relates generally to turbofan gas turbine engines, and more specifically to load reduction systems used in support systems for the fan assemblies of such engines.

A turbofan gas turbine engine used for powering an aircraft in flight typically includes, in serial flow communication, a fan assembly, a low pressure compressor or booster, a high pressure compressor, a combustor, a high pressure turbine, and a low pressure turbine. The combustor generates combustion gases that are channeled in succession to the high pressure turbine where they are expanded to drive the high pressure turbine, and then to the low pressure turbine where they are further expanded to drive the low pressure turbine. The high pressure turbine is drivingly connected to the high pressure compressor via a first rotor shaft, and the low pressure turbine is drivingly connected to both the fan assembly and the booster via a second rotor shaft.

The fan assembly includes a plurality of circumferentially spaced apart fan blades extending radially outwardly from a rotor disk that is drivingly connected to the low pressure shaft. Each fan blade generally has an airfoil section and an integral dovetail root section that attaches the blade to the rotor disk. The fan assembly is rotatively supported on a nonrotatable frame, commonly referred to as the fan frame, by a support system that typical includes a number of bearings and bearing support structure.

During engine operation, there is a remote possibility that a foreign body, such as a bird, could impact the fan assembly and cause part or all of a fan blade to become detached from the rotor disk. Such a blade loss would create a large imbalance, which could result in the transmission of potentially damaging imbalance forces to the fan frame. To alleviate the transmission of such imbalance forces, it is known to provide the support system with a decoupler (also commonly referred to as a "fuse") which is a frangible structure designed to fail in response to a predetermined load. Thus, in the event of a blade loss, the unbalanced rotation of the fan assembly will cause the decoupler ("fuse") to fail such that substantial imbalance forces are not transmitted to the fan frame. Accordingly, use of a decoupler effectively reduces the overall weight of the engine because the fan frame and related structure need not be made sufficiently strong to withstand substantial imbalance forces. This structural decoupling will also reduce the stiffness of the fan assembly support system and hence will decrease the natural frequency of the fan assembly.

Although standard procedure is to quickly shut down the engine in the rare event of a blade loss, the fan assembly will continue to rotate due to windmilling caused by the forward motion of the engine. As the fan assembly slows down to the lower windmilling speed, "recoupling" of the fan assembly and the fan frame will occur through the contact load paths between the booster rotor blades and the booster stator and/or between the fan blades and the fan casing. Such recoupling will provide a new transmission path to the fan frame for the imbalance forces, resulting in undesirable engine and/or airframe vibration. This vibration can be particularly troublesome if the depressed natural frequency of the fan assembly is equal to or close to the windmilling speed because of the resulting resonant or slightly off-resonant operation.

The conventional load reduction devices (LRDs) are designed to provide limited decoupling at high speed in order to place the decoupled mode natural frequency of the fan rotor system above the windmilling speed of the engine. The conventional load reduction devices provide limited fan rotor decoupling whereby the fan rotor forward bearing ("No. 1 Bearing") is fused and the fan case aft bearing ("No. 2 bearing") is only partially fused. In conventional designs, further load reductions by additional decoupling of the load paths at additional bearing locations such as the No. 2 bearing location, has not been possible in order to maintain sufficient residual stiffness to maintain decoupled mode natural frequency above the windmilling speed to obtain stable operation with acceptable response levels during windmilling operation.

Accordingly, it would be desirable to have a fan assembly support system which reduces in-flight engine vibration at windmilling speeds after a fan blade damage induced structural decoupling of the fan rotor from its support system. It is desirable to have a tuned and damped load reduction device and system that permits increased decoupling and increased load reduction at high speeds. It is desirable to have a tuned and damped decoupling and load reduction system which enables windmilling operation with no speed restriction.

BRIEF DESCRIPTION OF THE INVENTION

The above-mentioned need or needs may be met by exemplary embodiments which provide a rotor decoupler system 50 for a gas turbine engine comprising a load reduction system 60 disposed between a bearing system 36 and the bearing support 70. The load reduction system 60 comprises a fuse 75 and a damper 71 such that the damper 71 transfers at least a part of the radial load from the rotor 12 to the bearing support 70 when a fuse 75 fails. In one exemplary embodiment the damper 71 comprises a wire mesh 51, disposed around the outer race of the bearing. In another exemplary embodiment the damper comprises a rope damper assembly. In yet another exemplary embodiment, a load reduction system 90 is disposed between a support structure 38 and a frame 26 comprising an extensional fuse 98 and a damper 93 disposed between the support structure 38 and the frame 26 such that the damper 93 transfers at least a part of the unbalance load to the frame 26 when an extensional fuse 98 fails.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
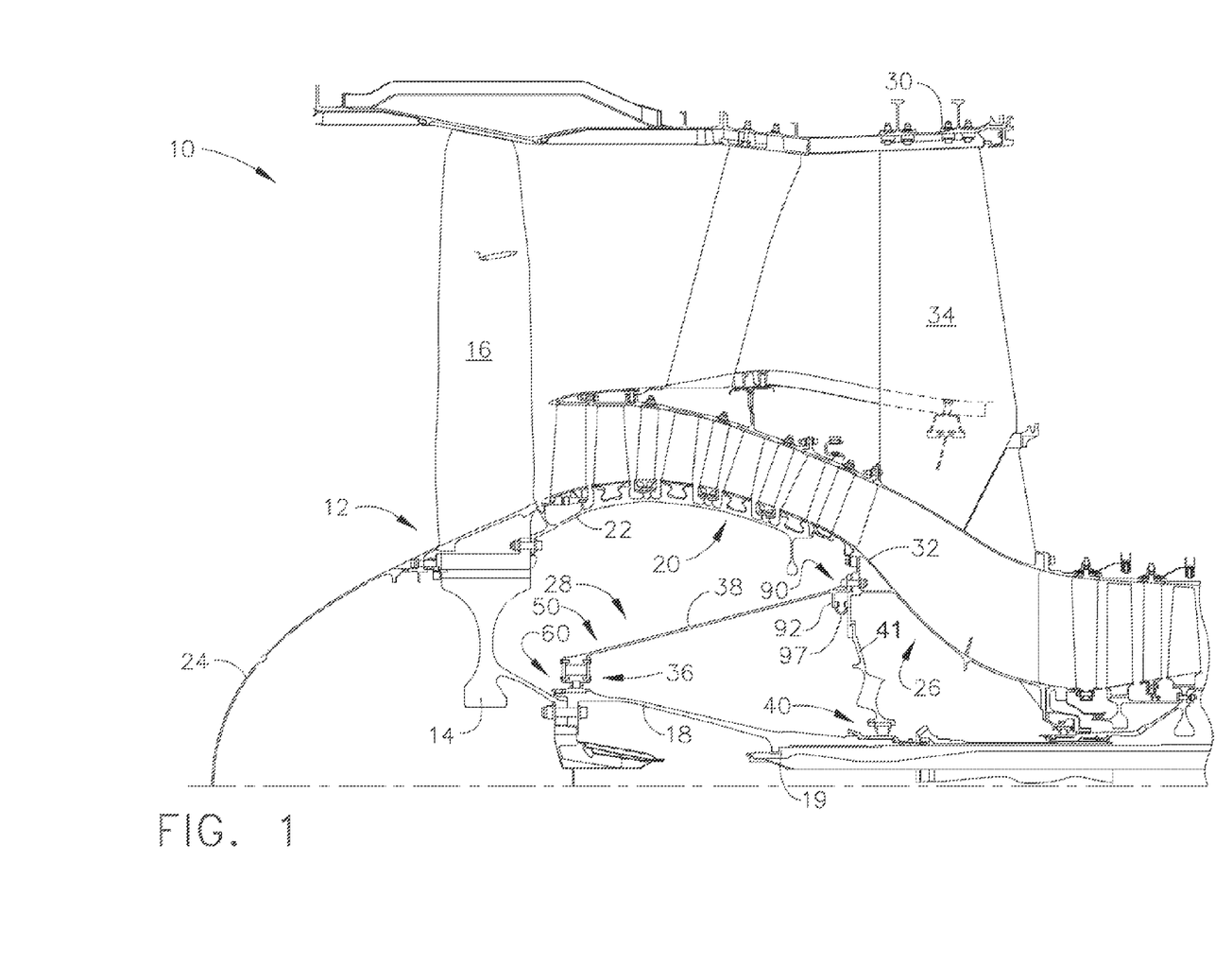
FIG. 1 is a partial, cross-sectional side view of an exemplary turbofan gas turbine engine having a fan assembly with an exemplary embodiment of a rotor decoupler system of the present invention.

Referring to the drawings wherein identical reference numerals denote the same elements throughout the various views, FIG. 1 illustrates a longitudinal cross-sectional view of an exemplary high bypass ratio turbofan engine 10 having a fan rotor 12 with an exemplary embodiment of a rotor decoupler system 50 of the present invention. The engine 10 includes a fan rotor 12 comprising a rotor disk 14, a plurality of circumferentially spaced apart fan or rotor blades 16 (only one shown in FIG. 1) which extend radially outwardly from the disk 14, and a fan shaft 18 that is powered by a conventional low pressure turbine (not shown). The rotor disk 14 is drivingly connected to the fan shaft 18.

Disposed downstream of the fan rotor 12 is a booster compressor 20 having axially spaced apart vane and blade rows, with the blades thereof being joined to a booster spool or shaft 22. The booster shaft 22 is suitably fixedly joined to the aft side of the rotor disk 14 in a conventional manner. A conical spinner 24 is joined to the forward side of rotor disk 14 to provide an aerodynamic flow path for air entering the fan assembly 12. Other, conventional structures of the engine 10, such as a high pressure compressor, combustor, high pressure turbine, and low pressure turbine are not shown for clarity of illustration.

The fan rotor 12 is rotatively supported on a stationary fan frame 26 by a support system 28. The fan frame 26 includes an annular outer casing 30, an inner hub 32, and a plurality of circumferentially spaced apart struts 34 extending therebetween. The struts 34 are airfoil shaped since bypass air passes between the adjacent ones thereof The support system 28 includes a forward bearing system 36 (alternatively referred to as "No. 1 bearing"), an aft bearing system 40 (alternatively referred to as "No. 2 bearing"), a forward bearing support structure 38 and an aft bearing support 41. The forward bearing support structure 38 shown in FIG. 1 is in the form of a cone. Other suitably shaped support structures may also be used to support the forward bearing. The forward bearing system 36 is disposed between the fan shaft 18 and the forward bearing support 38. The aft bearing system 40 is disposed between the fan shaft 18 and the aft bearing support 41. The forward bearing support 38 and the aft bearing support 41 are secured to the inner hub 32. FIG. 1 shows a rotor decoupler system 60 according to an exemplary embodiment of the present invention at the forward bearing 36 location. FIG. 1 also shows another rotor decoupler system 90 according to another exemplary embodiment of the present invention located at the aft end of the support structure 38. It is to be noted that embodiments of the present invention may be located at other locations also, such as for example, at the aft bearing location, as will be clear from the descriptions below.

Figure 2:
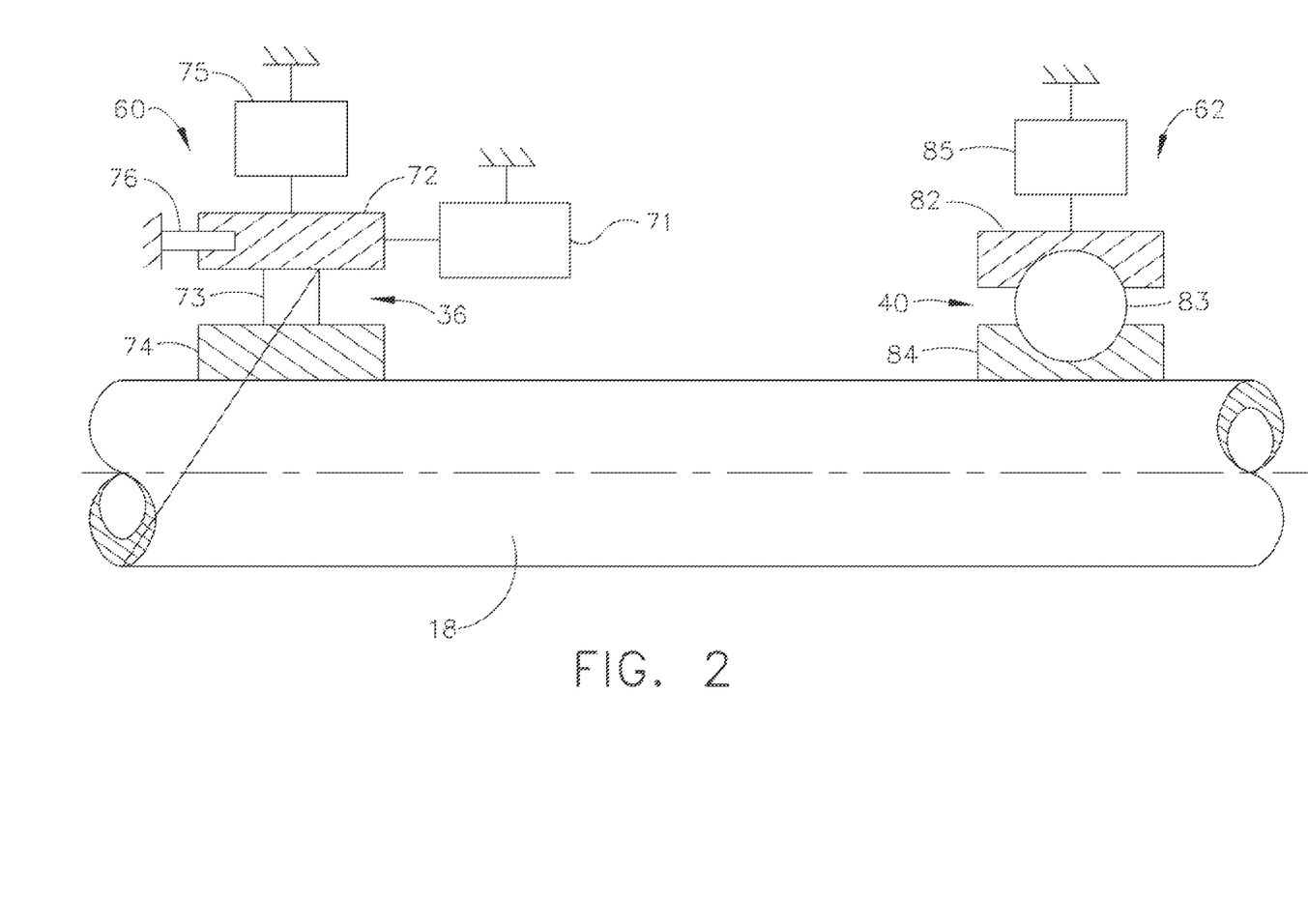
FIG. 2 is schematic illustration of a load reduction system according to an exemplary embodiment present invention.

FIG. 2 shows schematically an exemplary embodiment of a rotor decoupler system according to present invention. The shaft 18 is drivingly connected to a rotor (not shown in FIG. 2 for clarity), such as for example, the fan rotor 12 shown in FIG. 1. The exemplary embodiment of the present invention shown schematically in FIG. 2 comprises a forward bearing system 36 comprising an inner race 74, an outer race 72 and bearing elements 73 located between the inner race 74 and the outer race 72. The inner race is attached to the fan shaft 18. The outer race is attached to the forward bearing support 38, using a frangible fuse 75. An anti-rotation pin 76 is installed between the outer race and the support structure to prevent rotation of the outer race when the fuse 75 fails. Any conventional type of fuse 75 may be used.

In the exemplary embodiment of the present invention shown schematically in FIG. 2, the outer race is associated with a damper 71 which is in parallel with the fuse 75. The damper 71 provides a parallel load path for the transfer of the bearing loads from the shaft 18 to the support structure 70. During normal operation of the rotor 12, bearing loads are transferred from the shaft 18 to the support structure 70 through the fuse 75 and a part of the bearing load may also be transferred in parallel through the damper 71. Fuse 75 has a failure point below the failure point of the support structure 38. The reduced failure point allows the fuse 75 to fail during a large imbalance event, such as a fan blade out, prior to the failure of the remaining support structures. The failure of the fuse 75 reduces the structural load transferred through the fuse 75 to the remaining support structure 38. When this happens more of the unbalance load is transferred to the damper 71.

Figure 3:
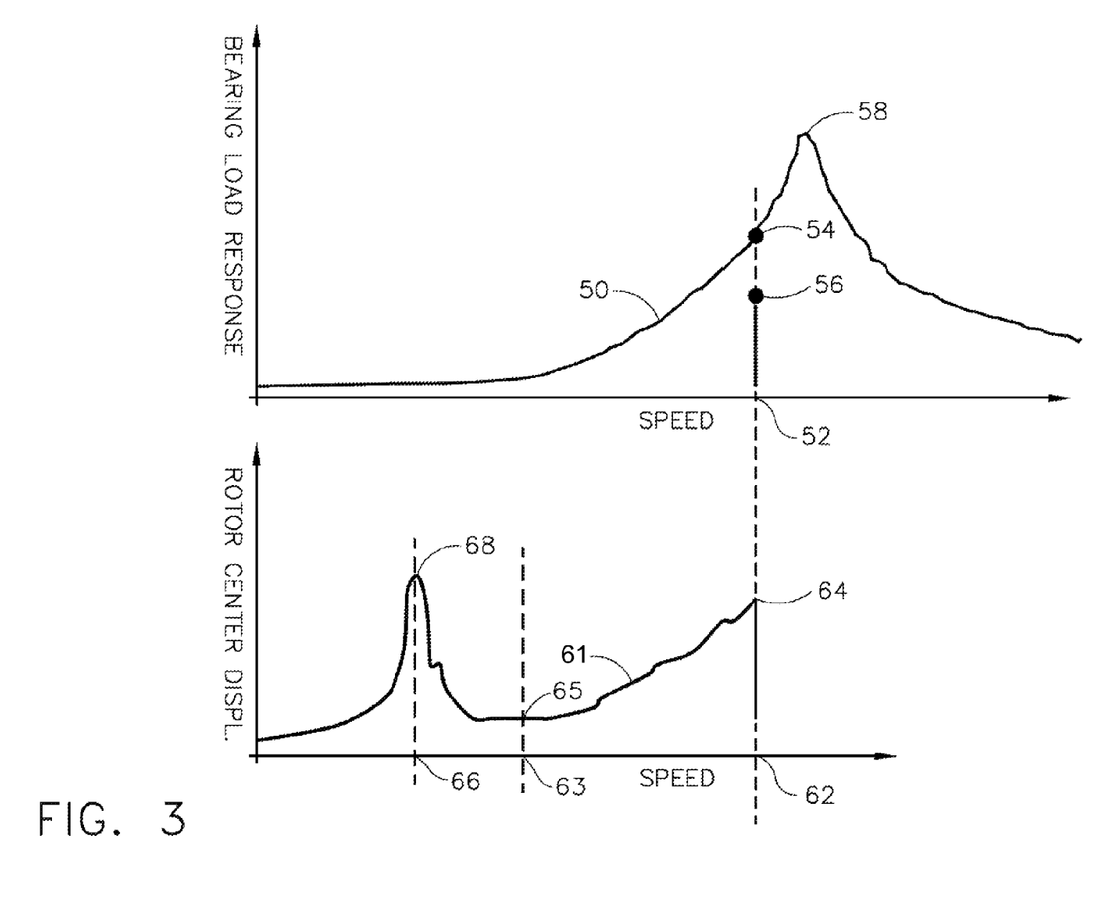
FIG. 3 is an exemplary bearing load and displacement response of a turbofan gas turbine engine having the fan assembly with a load reduction system of the present invention.

FIG. 3 shows exemplary bearing load response 50 and displacement response 61 of a turbofan gas turbine engine 10 having the fan rotor 12 with an exemplary rotor decoupler system of the present invention schematically shown in FIG. 2. If an excessive unbalance event, such as fan blade out, occurs at a high speed 52, the potential unbalance load 54 experienced by the bearing and support systems may be high. However, the fuse 75 is designed to fail first by having a failure point 56 which is lower than the potential load level 54, so as to protect the remaining structures from severe damage. When a fuse 75 fails due to an excessive unbalance load, the rotor and the bearing may experience a radial displacement due to the unbalanced load. The natural frequency of the rotor system is reduced (shown as item 66 in FIG. 3) due to a reduction of the stiffness of the bearing and support systems. The engine may be shut down during such abnormal unbalance conditions and the engine may experience windmilling at a lower rotor speed 63. In order to avoid the rotor operation at the resonance conditions, it is necessary to keep the windmilling speed different from the natural frequency of the rotor system. The damper 71 dampens the peak response 68 of the rotor system as the rotor natural frequency 66 drops below the windmilling speed 63. In other words, the presence of the damper 71 permits the operation of the engine at a rotor speed 63 higher than the reduced natural frequency 66 of the rotor system. Without the presence of the damper 71 such as shown in FIG. 2, the windmilling speed would have to be controlled to be at a lower level than the lowered natural frequency 66 of the decoupled rotor, and the response level 68 would be higher.

In another embodiment of the present invention, the aft bearing 40 is also provided with a fuse 85 in addition to the fuse 75 and damper 71 for the forward bearing 36. This is shown schematically in FIG. 2. The presence of additional fuses, such as 85, may further lower the stiffness of the support systems under extreme unbalance loads and hence further lower the resonant frequency 66 of the decoupled rotor system. However, the presence of the damper 71 helps to reduce the peak response of 68 of the decoupled rotor system. Although the forward bearing element 73 is shown in FIG. 2 as a roller element and aft bearing element 83 is shown as a ball element for illustration purposes, it is to be understood that each of these bearing elements may be of either the ball element or the roller element.

Figure 4:
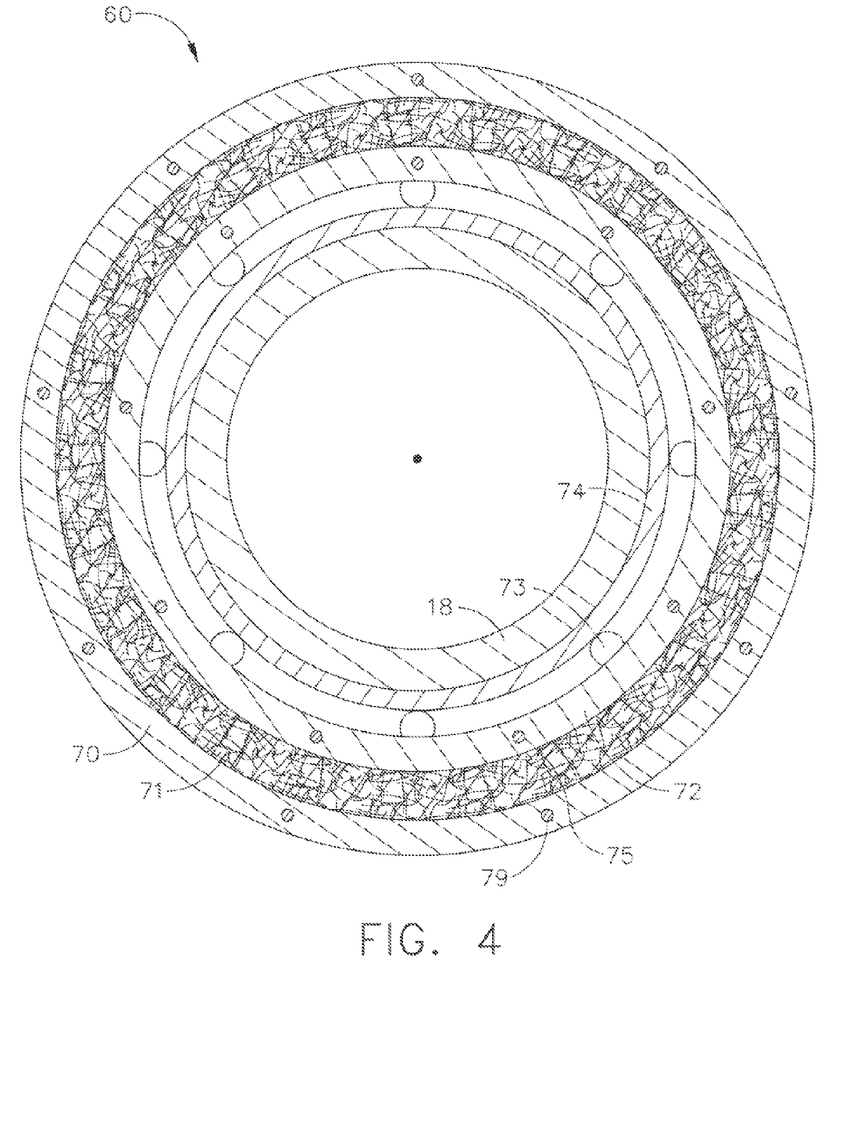
FIG. 4 is an axial view of an exemplary embodiment of a load reduction device according to the present invention.
Figure 5:
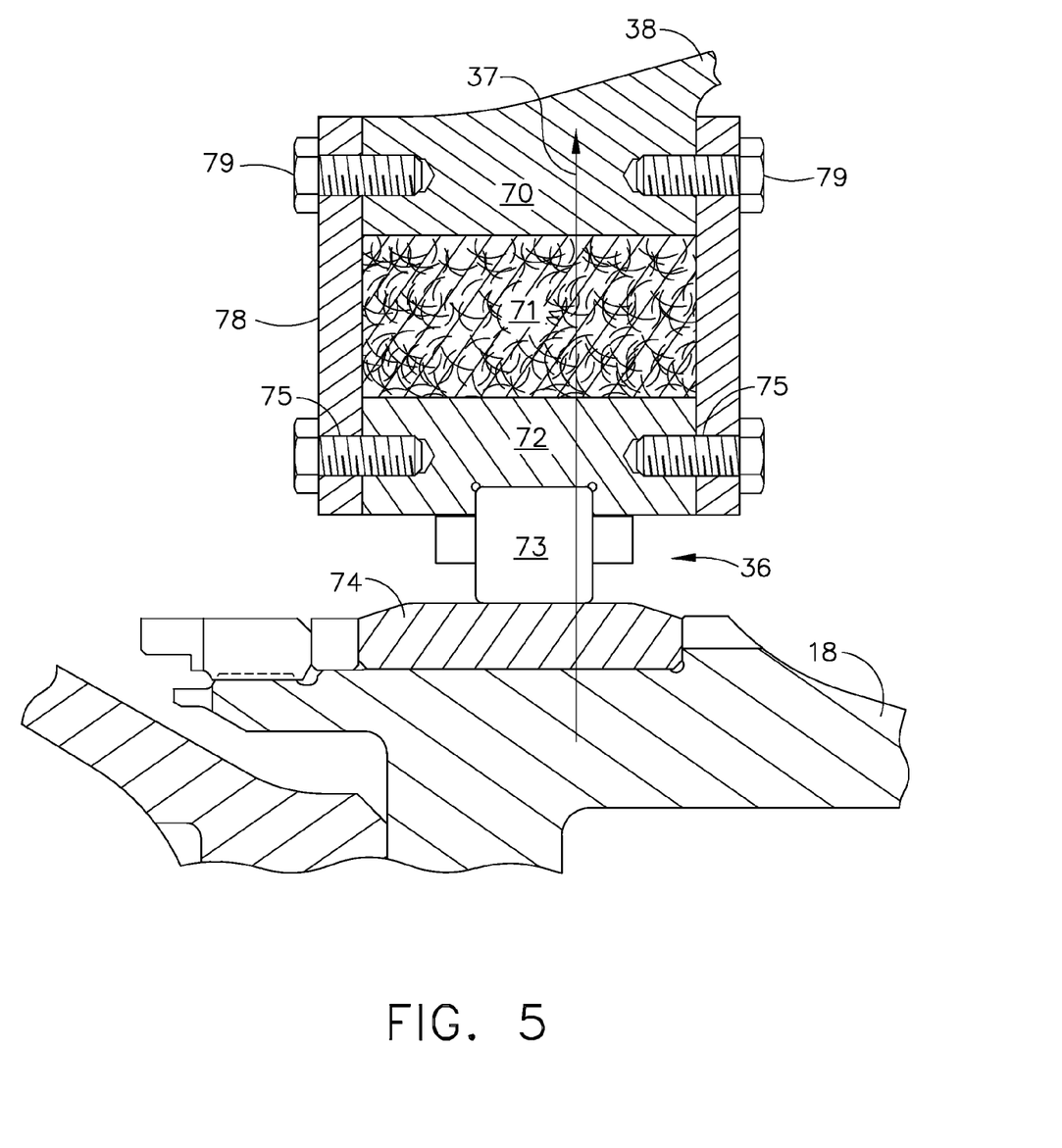
FIG. 5 is an axial cross sectional view of an exemplary embodiment of a load reduction device according to the present invention.

An exemplary embodiment of the present invention is shown in frontal view in FIG. 4 and in axial cross sectional view in FIG. 5. In FIGS. 4 and 5, the damper 71 is a wire mesh having a toroidal shape, located circumferentially around the outer race. It is disposed between the outer race 72 and the bearing support 70. The damper 71 is axially retained by retainer plates 78. The retainer plates are attached to the bearing support structure by means of fasteners 79. Other conventional means of attachment may also be used for this purpose. The retention plates 78 are attached to the bearing outer race 72 using fuse elements 75. In the exemplary embodiment shown in FIGS. 4 and 5, the fuse element 75 shown is a shear-type fuse element, which fails in shear in case of extreme unbalance loads described before. Any other conventional fuse element may also be used for this purpose. Under normal operating conditions, most of the bearing loads 37 are transferred to the bearing support 70 though the outer race 72, the fuse 75 and the retainer plates 78. Some loads may also be transferred by the damper 71. When the fuse element 75 fails in shear, the radial load from the forward bearing 36 is transferred to the damper 71 which transfers it to the bearing support 70. Although shear elements are shown as screws, it is to be understood that other suitable fuses and retention means, such as bolts, may be used. Other conventional fuse elements may also be used. One of the advantages of the present invention is that the system can be tuned to have a decoupled mode natural frequency by adjusting the damper and fuse parameters and the stiffness of the support structures. In the exemplary embodiment shown in FIG. 4, nine fuse elements of the shear-type are arranged circumferentially around the forward side of the outer race 72. Similarly nine fuse elements of the shear-type are arranged circumferentially around the aft side of the outer race 72. In an exemplary embodiment, the wire mesh damper 71 has an inside diameter of about 8 inches and an outside diameter of about 12 inches and has a thickness of about 3 inches. It is made from commercially available steel. It is possible to obtain approximately 20% damping to limit the rotor displacements. The ratio of the windmilling rotor speed to the decoupled mode rotor frequency is about 2.92.

Figure 6:
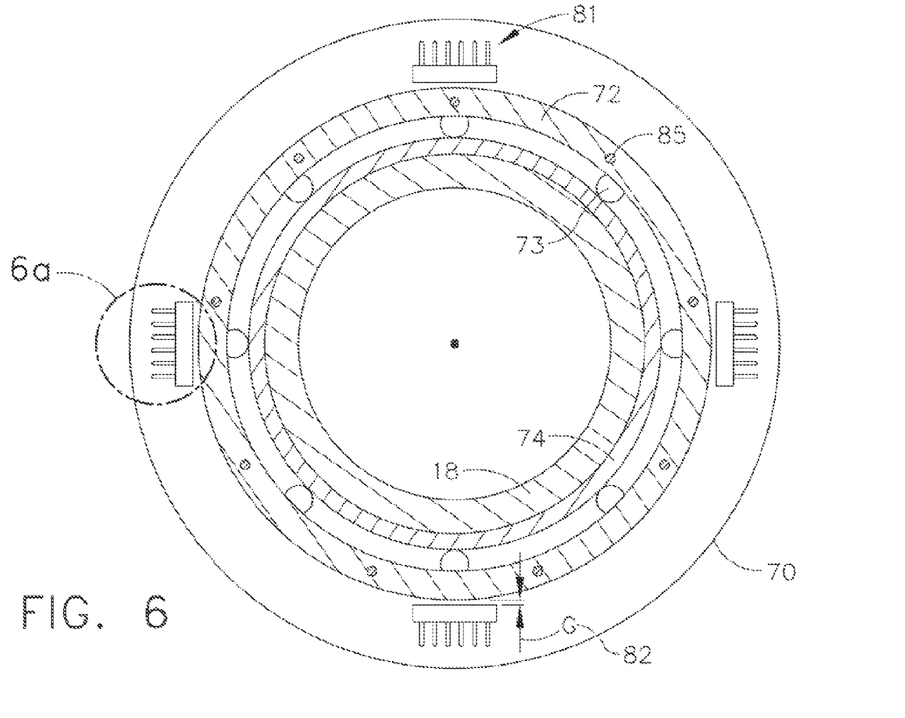
FIG. 6 is an axial view of another exemplary embodiment of a load reduction device according to the present invention.

Another exemplary embodiment of the invention which uses a rope damper assembly 81 is shown in FIG. 6. A plurality of rope damper assemblies 81 are disposed between the outer race 72 and the bearing support 70. In the exemplary embodiment shown in FIG. 6, four rope damper assemblies 81 are shown arranged around the circumference of the outer race 72, located at diametrically opposite locations. The number of rope damper assemblies needed can be chosen using conventional techniques to withstand the anticipated unbalance loads in any application. Although the rope damper assemblies 81 are shown in segments in FIG. 6, it is possible that a continuous assembly of rope dampers can be used circumferentially around the outer race 72. An exemplary rope damper assembly 81, shown in FIG. 6a, comprises six rope dampers 91, made from steel ropes. Each of these rope dampers are attached to the rope damper plates using fasteners.

In some rotor designs, the rope damper assemblies may be located such that there is a gap G, shown as item 82 in FIG. 6, between the bearing outer race 72 and the rope damper plate 94. The gap G provides for a certain radial deflection of the rotor 12 under extreme unbalance load conditions prior to activating the dampening provided by the rope damper assemblies 81. It may be possible to "tune" the rotor assembly using the gap G, in order to have a suitable value for the resonant frequency for the rotor when it is decoupled under extreme unbalance load conditions. In the exemplary embodiment shown in FIG. 6, the gap G is about 0.100 inches. It is also possible to have a rotor system which does not have a gap G.

Figure 6A:
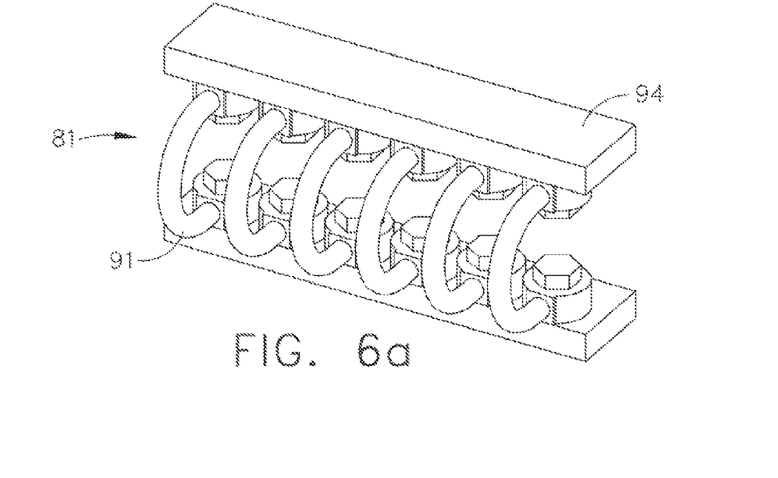
FIG. 6a is a perspective view of an exemplary damper used in the load reduction device shown in FIG. 5.
Figure 7:
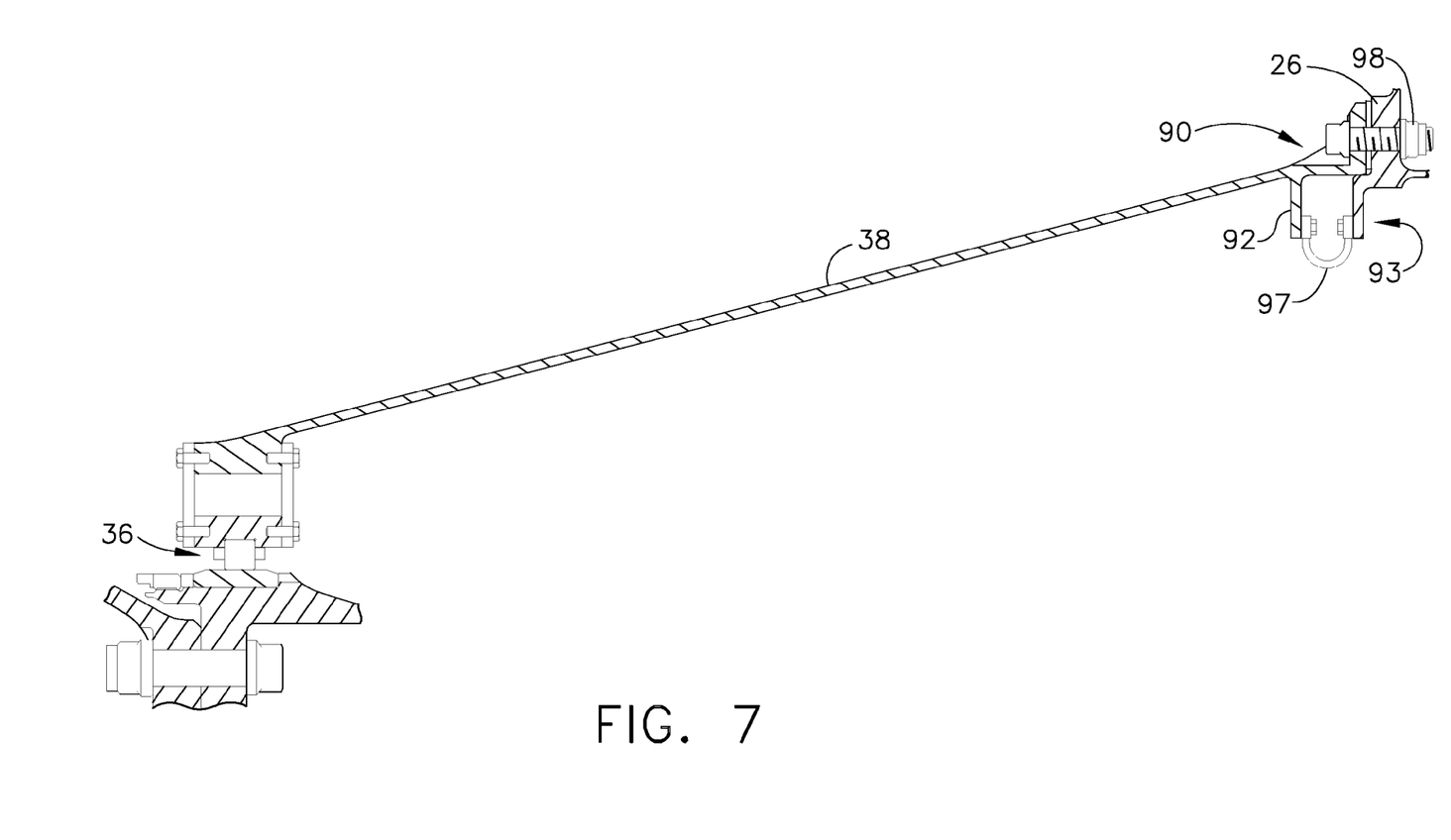
FIG. 7 is an axial view of another exemplary embodiment of a load reduction device according to the present invention located on a bearing cone.

It is possible to have a rotor decoupler system contemplated by the present invention at locations away from the forward bearing 36 and the aft bearing 40. An exemplary embodiment of such a decoupler system 90 located at the aft end of the support structure 38 is shown in FIG. 7. The support structure 38 is attached to the frame 26 using conventional attachment means. A conventional extensional fuse element 98 is shown in FIG. 7. Under extreme unbalance loads, such as from a fan blade out event, the moment loads from the bearing 36 create tension loads in the extensional fuse 98. Damper assemblies 97 such as shown in FIG. 6a, are disposed between the support structure and the frame 26. Although a rope damper assembly 97 is shown as exemplary embodiment in FIG. 7, other suitable dampers, such as the wire mesh damper 71 shown in FIGS. 4 and 5 may also be selected for use. Under extreme unbalance load events, such as during a fan blade out event, the extensional fuse 98 fails in tension and the axial and moment bearing loads are transferred through the damper assemblies 97 which provide damping for the rotor response as described before.

It is contemplated that it is possible to have embodiments of the present invention shown herein at multiple locations in an engine. For example, it is possible to have the rotor decoupler system 90 shown in FIG. 7 along with other rotor decoupler systems shown herein at other locations, such as the forward bearing and the aft bearing as shown previously.

An example rotor decoupler system for a gas turbine engine may include a shaft connected to a rotor; a support structure secured to a frame, said support structure having at least one bearing support; at least one bearing system comprising an inner race, an outer race and a bearing element located between the inner race and the outer race; and a load reduction system disposed between the bearing system and the bearing support, said load reduction system comprising at least one fuse attached to the outer race and a damper disposed between the outer race and the bearing support such that the damper transfers at least a part of the radial load from the rotor to the bearing support when at least one fuse fails. At least one retainer plate may be attached to the outer race and the bearing support. The system may further comprise a moment load reduction system disposed between the support structure and the fan frame having at least one fuse capable of failing when an extensional load supported by the fuse exceeds a known limit.

An example rotor decoupler system for a gas turbine engine may include a shaft connected to a rotor; a forward bearing support; an aft bearing support; a forward bearing system comprising an inner race, an outer race and a plurality of bearing elements located between the inner race and the outer race; a load reduction system disposed between the forward bearing system and the forward bearing support, said load reduction system comprising at least one fuse attached to the outer race and a damper disposed between the outer race and the bearing support such that the damper transfers at least a part of the radial load from the rotor to the bearing support when at least one fuse fails; an aft bearing system located axially aft from the forward bearing system, said aft bearing system comprising an aft inner race, an aft outer race and a plurality of an aft bearing elements located between the aft inner race and the aft outer race; and a load reduction system disposed between the aft bearing system and the aft bearing support, said load reduction system comprising at least one aft fuse.

An example rotor decoupler system for a gas turbine engine may include a shaft connected to a rotor; at least one bearing system coupled to the shaft and a bearing support; and a support structure that provides support for the bearing system wherein the support structure is secured to a frame using a load reduction system disposed between the support structure and the frame, said load reduction system comprising at least one extensional fuse for attaching the support structure to the frame and a damper disposed between the support structure and the frame such that the damper transfers at least a part of the load from the rotor to the frame when at least one extensional fuse fails.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor decoupler system for a gas turbine engine, said rotor decoupler system comprising:
    a shaft connected to a rotor;
    a support structure secured to a frame, said support structure having at least one bearing support;
    at least one bearing system comprising an inner race, an outer race and a bearing element located between the inner race and the outer race; and
    a load reduction system disposed between the bearing system and the bearing support, said load reduction system comprising at least one fuse attached to the outer race and a damper disposed between the outer race and the bearing support such that the damper transfers at least a part of the radial load from the rotor to the bearing support when at least one fuse fails;
    wherein the damper comprises a wire mesh.

2. A system according to claim 1 wherein the damper is disposed circumferentially around the outer race.

3. A system according to claim 1 wherein at least one retainer plate is attached to the outer race and the bearing support.

4. A system according to claim 1 wherein the fuse is a shear element.

5. A system according to claim 1 wherein a plurality of fuses are arranged circumferentially around the outer race.

6. A system according to claim 1 further comprising a moment load reduction system disposed between the support structure and the frame having at least one extensional fuse capable of failing when an extensional load supported by the extensional fuse exceeds a known limit.

7. A rotor decoupler system for a gas turbine engine, said rotor decoupler system comprising:
    a shaft connected to a rotor;
    a forward bearing support;
    an aft bearing support;
    a forward bearing system comprising an inner race, an outer race and a plurality of bearing elements located between the inner race and the outer race;
    a load reduction system disposed between the forward bearing system and the forward bearing support, said load reduction system comprising at least one fuse attached to the outer race and a damper disposed between the outer race and the bearing support such that the damper transfers at least a part of the radial load from the rotor to the bearing support when at least one fuse fails;
    an aft bearing system located axially aft from the forward bearing system, said aft bearing system comprising an aft inner race, an aft outer race and a plurality of an aft bearing elements located between the aft inner race and the aft outer race; and
    a load reduction system disposed between the aft bearing system and the aft bearing support, said load reduction system comprising at least one aft fuse;
    wherein the damper comprises a wire mesh.

8. A system according to claim 7 wherein the fuse is a shear element.

9. A system according to claim 7 wherein the bearing elements are rollers.

10. A system according to claim 7 wherein the bearing elements are balls.

11. A rotor decoupler system for a gas turbine engine, said rotor decoupler system comprising:
    a shaft connected to a rotor;
    at least one bearing system coupled to the shaft and a bearing support; and
    a support structure that provides support for the bearing system wherein the support structure is secured to a frame using a load reduction system disposed between the support structure and the frame, said load reduction system comprising at least one extensional fuse for attaching the support structure to the frame and a damper disposed between the support structure and the frame such that the damper transfers at least a part of the load from the rotor to the frame when at least one extensional fuse fails.

12. A system according to claim 11 wherein the damper comprises at least one rope damper.

13. A system according to claim 11 wherein the damper comprises a wire mesh.

* * * * *